April 24, 1934.　　　G. B. BENANDER　　　1,956,409
ELECTRIC CONNECTER
Filed April 13, 1932
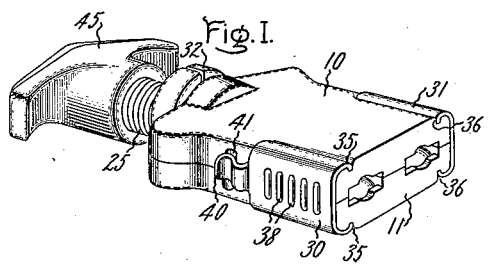
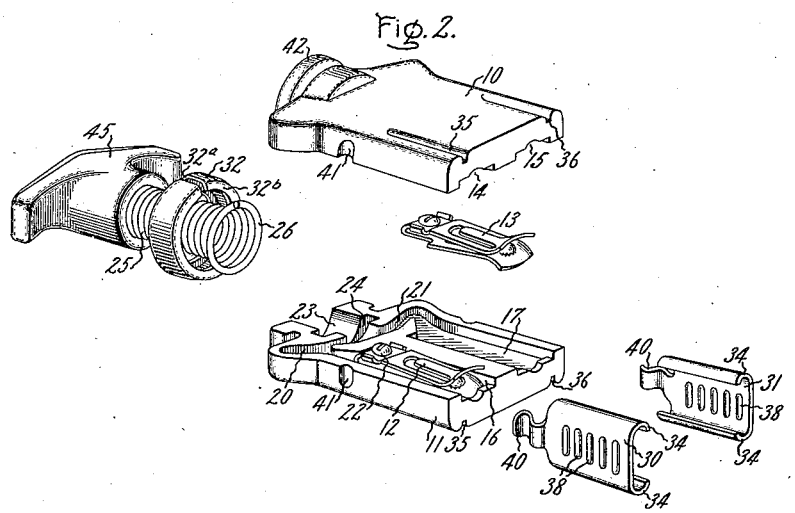
Inventor:
George B. Benander,
by Charles V. Tullar
His Attorney.

Patented Apr. 24, 1934

1,956,409

UNITED STATES PATENT OFFICE 1,956,409

ELECTRIC CONNECTER

George B. Benander, Yalesville, Conn., assignor to Monowatt Electric Corporation, Bridgeport, Conn., a corporation of Connecticut Application April 13, 1932, Serial No. 604,960

10 Claims. (Cl. 173—332)

My invention relates to electric connecters and the like and has for its object the provision of a simple, reliable, efficient and inexpensive device of this character.

Although not limited thereto, my invention has particular application to detachable plug connecters, such as are used on electric heating appliances and the like.

In one of its aspects, my invention contemplates the provision of an improved device of this character which can be manufactured and assembled at comparatively low cost, and further, can be quickly disassembled for inspection and replacement of parts.

In carrying out my invention in one form thereof, I make the connecter out of a pair of similar mating insulating body members which are arranged to receive and secure the contacts of the connecter between them. Suitable clamping members are provided to secure these members together. Preferably, the body members will be provided with channels on opposite sides of their meeting plane, and the clamping members will be provided with jaws slidably received in the channels so as to secure the bodies. If desired, the body members may be provided with additional securing means in the form of a ring engaging and surrounding a circular flange defined by cooperating flanges formed on the body members.

For a more complete understanding of my invention, reference should be had to the accompanying drawing in which Fig. 1 is a perspective view of an electric connecter embodying my invention, and Fig. 2 is an expanded view of the connecter of Fig. 1 showing the relation of the parts and details of construction.

Referring to the drawing, I have shown my invention in one form as applied to electric connecters of the quick detachable type, such as are used on waffle irons, toasters, coffee makers and like heating appliances, although it is not limited thereto.

As shown, the connecter comprises two insulating body members 10 and 11 which are similar in construction and which may be molded or otherwise suitably formed of an electrically insulating material.

Each of these members 10 and 11 is provided with similar sets of recesses for securing contact members 12 and 13. As shown, the member 10 is provided with a pair of spaced substantially parallel recesses 14 and 15, and the member 11 is provided with a similar pair of recesses 16 and 17. These recesses are arranged longitudinally of the body members and, as will be readily understood by those skilled in the art, cooperate with each other when the members 10 and 11 are assembled (Fig. 1) to define longitudinally arranged parallel chambers in which the contact members are received and secured.

Leading from the grooves 16 and 17 of the member 11 are grooves 20 and 21 which cooperate with similar grooves provided in the member 10 to define passageways through which electrical conductors (not shown) are directed to the terminal members 12 and 13 for connection with terminal or binding screws 22. The grooves 20 and 21 of the member 10 and their mating grooves of the member 11 terminate in semi-cylindrical recesses 23 (only that for the member 11 being shown), which cooperate to define a cylindrical passageway through which the supply conductors are led into the plug housing.

Each member 10, 11 at the base of its recess 23 is provided with a deeper recess 24 which cooperates with the recess 24 of the other member to define an annular channel. This channel serves to secure a helically coiled conductor support and guard 25. This member, as shown, is provided at its secured end with a flange 26 which is locked in the cylindrical channel to secure the guard. The flange 26 may be, and as shown is, formed by winding the end turns of the helix on a larger diameter.

The members 10 and 11 are detachably secured by means of a pair of clips or clamping members 30 and 31 and a clamping ring member 32. As shown (Fig. 1), the clamping members 30 and 31 are positioned astride the meeting plane or meeting edges of the members 10 and 11.

As shown, each clamping member 30, 31 is given the shape of an elongated or extended U, the legs of which are turned inwardly somewhat at their ends so as to form substantially parallel spaced jaws 34.

The body members 10 and 11 are provided with pairs of cooperating channels 35 and 36 which function to slidably receive the jaws 34 of the clamping members. As shown, the channels of each set are symmetrically arranged in substantially parallel relation on opposite sides of the adjacent meeting edges of the members 10 and 11.

The clamping members 30 are so proportioned that when they are applied to the plug bodies, as shown in Fig. 1, the jaws will be slightly spread apart. This spreading is opposed by the resiliency of the material forming the clamping members so that when these members are applied to their channels, they will function to bind and thereby secure the body members together.

Preferably, the clamping members 30 will be provided with knurled portions 38 to facilitate their application to the plug bodies and their removal therefrom.

In addition, the clamping members preferably will be provided with resilient latches 40 that are received in notches or recesses 41 provided for them in the body members 10 and 11. These latches assist to retain the clamping members in their assembled positions with the body members 10 and 11, and also provide handles or members which can be grasped to facilitate the removal of the clamping members.

The clamping ring member 32 is arranged to embrace a circular flange formed by cooperating semi-circular flange portions 42 on the exterior of the body members 10 and 11 and surrounding the channel 23 through which the supply conductors (not shown) are passed to the contact members 12 and 13. The opposite edges of the ring member 32 are inturned to define flanges 32a and 32b that engage the opposite sides of the flange 42, 42 when the ring is applied, as shown in Fig. 1. As shown, the member 32 is formed of a broken ring, whereby it can be conveniently applied to and removed from its flange.

In relatively small electric connecters, I have found that I can dispense with the ring 32 and the flange 42, the clamping action of the members 30 being sufficiently great to effectively secure the body members 10 and 11. For relatively large connecters, it is preferable to use the ring and flange as an additional precaution to prevent separation of the bodies.

If desired, a suitable handle 45 may be attached in any suitable manner to the spring guard 25, whereby the plug can be conveniently removed from the appliance to which it is attached.

It will be observed that in order to assemble the connecter with electrical supply conductors (not shown), it is merely necessary to thread the terminal ends of the conductors through the helical guard spring 25 and connect the conductors to the binding screws 32 of the contacts 12 and 13. Then these contacts are placed within the recesses 14 and 15 or 16 and 17 provided for them in one of the plug bodies 10, 11, and the flange 26 provided on the guard 25 is seated in the recess 24 of the body. Then the mating plug body 10, 11 is superposed on the first plug body, and thereafter the clamping members 30 are slid into their channels 35 and 36. If the ring 32 is used, this member will then be placed about its flange 42, 42 which will be provided to receive the ring member.

It will be observed that my plug is of a very simple and inexpensive construction. The contacts 12 and 13 and the spring guard 25 are secured merely by assembling and securing the body members 10 and 11. And these members are secured merely by slipping the clamping members 30 into their channels 35 and 36, and by clamping the rings 32 on its flange 42, 42.

To disassemble the plug, it is merely necessary to remove the ring and slip the clamping members 30 from their channels. The assembly and disassembly are thereby greatly simplified.

It is also to be noted that the clamping members 30 and 31 embrace and cover a considerable area of the surfaces of the bodies 10 and 11, and hence, in addition to their function of securing the body members also function as a protective armor for the bodies to protect them from breakage due to shocks, etc.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric connecter comprising a pair of separable insulating members, contacts secured between said members and a pair of elongated clamping members astride the meeting plane of said members engaging the respective side surface areas of said members on opposite sides of said meeting plane so as to secure said members, each of said clamping members having a body portion covering the surface areas of said insulating members on opposite sides of said meeting plane and lying between the points of engagement of said clamping members with said insulating members.

2. An electric connecter comprising contact members, cooperating separable insulating members housing said contact members and means securing said insulating members together comprising a clamping member astride the meeting plane of said insulating members and arranged to engage the opposite faces of said members to secure them in assembled positions, said insulating members being provided with a recess and said clamping member with resilient latching means fitted in said recess, and each of said clamping members having a body portion covering the surface areas of said insulating bodies on opposite sides of said meeting plane and lying between the points of engagement of said clamping members with said insulating members.

3. An electric connecter comprising contact members, a pair of separable insulating body members provided with mating recesses receiving said contact members, said members being provided with channels arranged longitudinally of said members on opposite sides of their meeting plane, and a clamping member provided with jaws slidably received in said channels longitudinally thereof to secure said body members and readily removable therefrom, said bodies being provided with depressions and said clamping member having a resilient latch fitted in said depressions.

4. An electric connecter comprising contact members, a plurality of separable body members encasing said contact members, said encasing members being provided with channels that are spaced from each other in substantially parallel relation when said members are assembled and an elongated U-shaped clamping member astride said body members so as to encase their surface area between said channels and having jaws received in said spaced channels and slidable longitudinally thereof.

5. An electric connecter comprising contact members, a pair of separable mating insulating body members enclosing said contact members, each of said body members having a pair of channels which cooperate with the channels of the other member to define two pairs of spaced substantially parallel channels, and a pair of elongated clips having substantially the length of said channels slidably received in said channels to secure said body members and each having a body portion covering the surface area of said members between said pairs of spaced parallel channels.

6. An electric connecter comprising a pair of separable insulating members, contacts secured between said members, each of said members being provided with channels located adjacent the meeting edges of said members and arranged in substantially parallel relation with the corresponding channels of the other member, and clamping members astride said meeting edges, each having a body portion covering the surface area of said members between their corresponding channels, and jaws received in said channels to secure said insulating members.

7. An electric connecter comprising a pair of separable insulating members, contacts secured between said members, said members being provided with channels at the sides of said members adjacent their meeting edges and substantially parallel therewith and elongated clamping members astride said edges provided with portions slidably and removably received in said channels, said portions having a length substantially equal to the length of said channels, and said clamping members being provided with body portions covering the surface areas of said body members at their edges lying between said channels.

8. An electric connecter comprising two separable mating insulating members constituting a plug body whose cross-section is elongated transversely, said members being provided with cooperating channels arranged longitudinally of said members in substantially parallel relation with each other on opposite sides of the meeting plane of said members and adjacent the meeting edges thereof, and a pair of elongated clamping members covering the side surface areas of said members and each provided with a pair of jaws slidably received in said cooperating channels so as to secure said members, said jaws having a length substantially equal to the length of said longitudinal channels.

9. An electric connecter comprising contact members, a pair of separable mating insulating bodies securing said contact members between them and constituting a plug, said bodies having cooperating channels on opposite sides of the meeting plane of said bodies and substantially parallel with each other, and a pair of elongated clamping members having a form corresponding to the surface areas of said bodies between said channels covering said areas and having jaws engaging said channels to secure said bodies in assembled relation.

10. An electric connecter comprising a pair of separable insulating body members, contact members housed by said body members, a pair of elongated clamping members on the sides of said body members astride their meeting plane, said clamping members having a U-shaped cross section, the legs of the U being inturned at their ends so as to form longitudinal jaws and means on said body members engaged by said jaws whereby said body members are secured.

GEORGE B. BENANDER.